INVENTOR.
Karl Börje Stromqvist
BY
his ATTORNEY

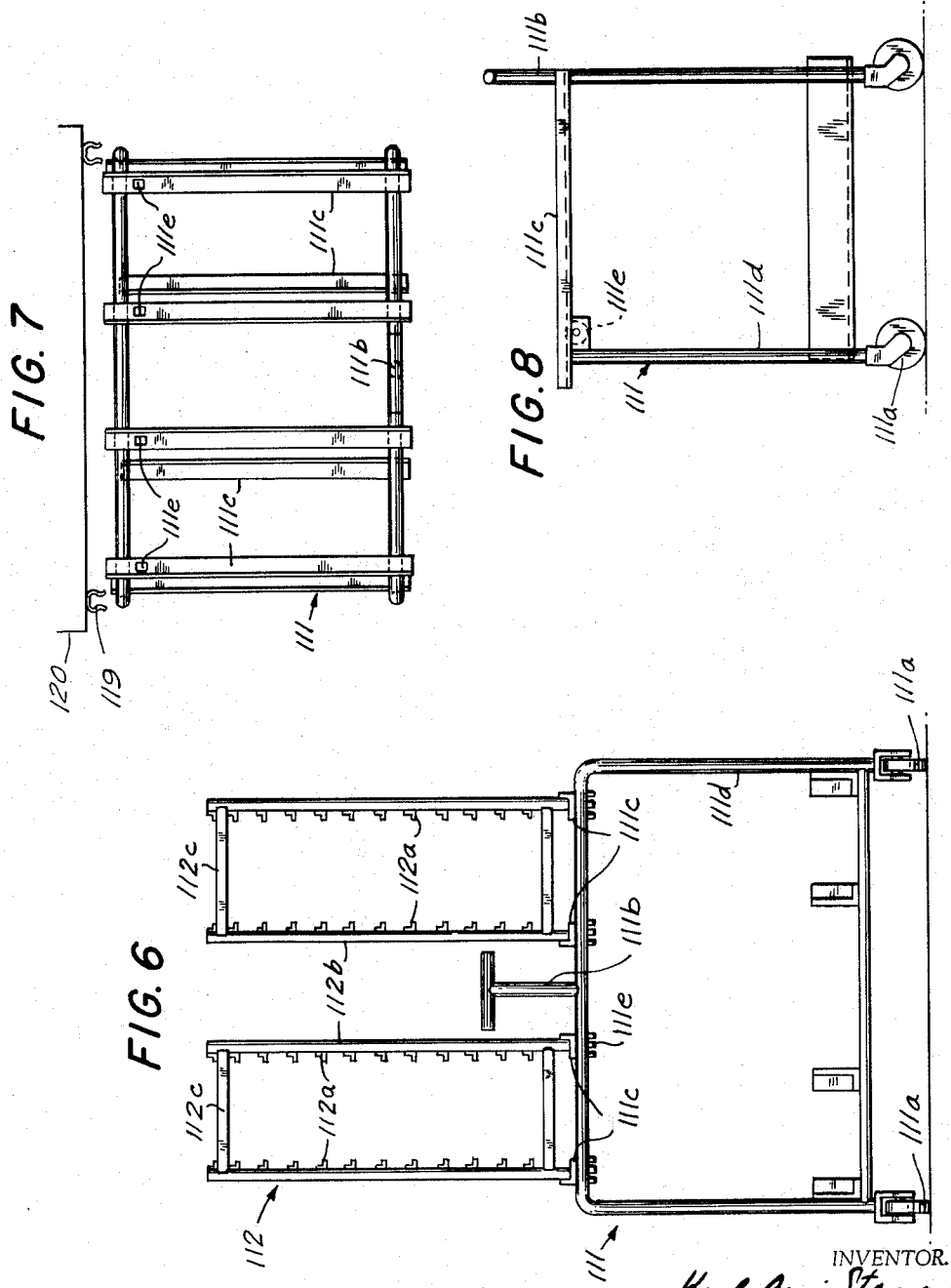

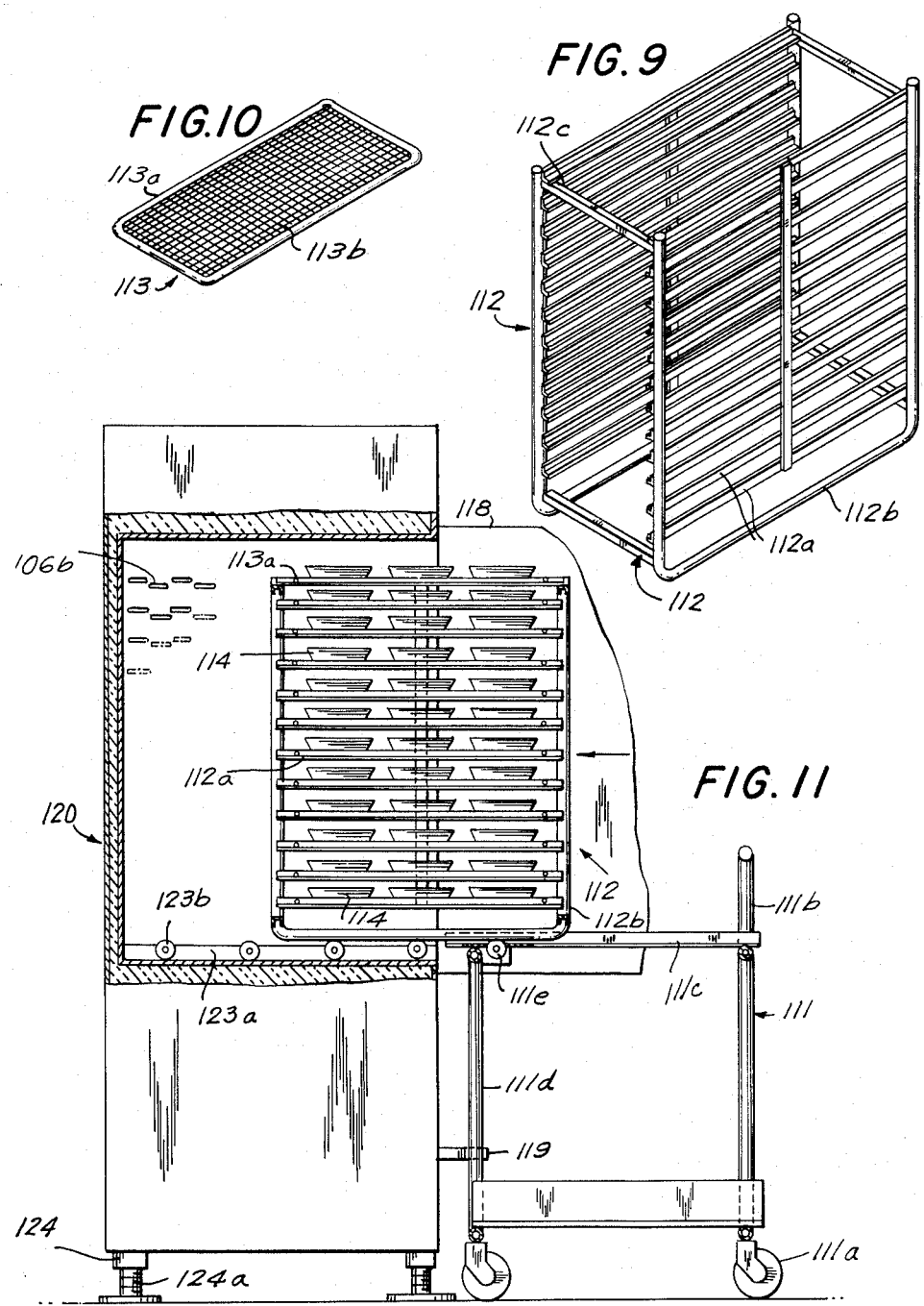

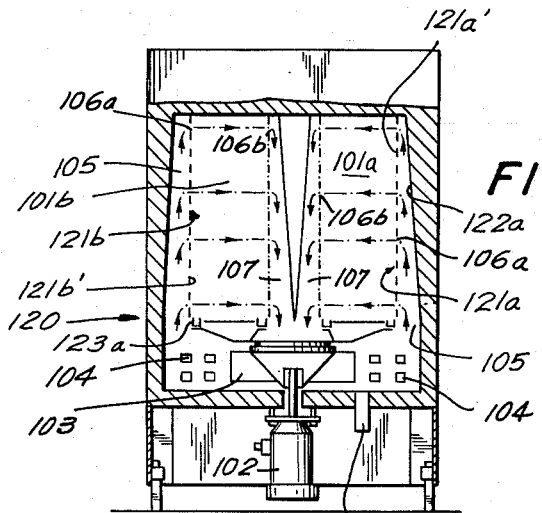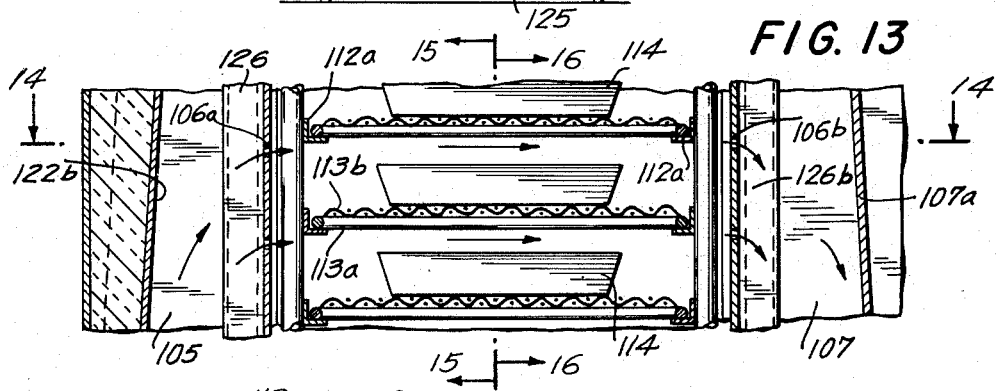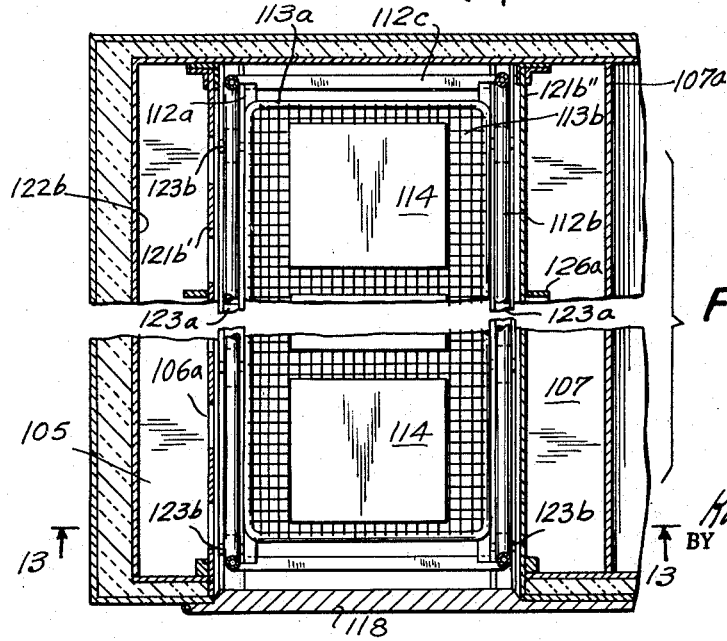

United States Patent Office 3,261,650
Patented July 19, 1966

3,261,650
FOOD HEATING AND HANDLING STRUCTURE
Karl Borje Stromqvist, Bandhagen, Sweden, assignor to Aktiebolaget Electrolux, Stockholm, Sweden, a corporation of Sweden
Filed Feb. 21, 1964, Ser. No. 346,560
5 Claims. (Cl. 312—236)

This is a continuation-in-part of application Serial No. 198,001, filed May 28, 1962, now abandoned.

This invention relates to structure for handling food and is especially concerned with structure for transferring into and from an upright heating space all at one time a plurality of receptacles containing food. More particularly, the invention relates to structure for openly stacking the receptacles one above another in vertically spaced relation and inserting and removing into and from an upright heating space all at one time one or more open stacks of the receptacles.

In schools, factories, industrial fairs and certain types of restaurants, for example, it is becoming more and more usual to serve precooked food which is heated in individual containers or dishes. Sometimes the food is deep-frozen which requires both thawing and heating in the container before it is served.

One difficulty in providing food service of this kind is obtaining approximately the same final temperature in all of the containers when a large number are heated at one time. Heretofore, the best solution has been to heat the containers in a warming oven which is kept at about the final temperature to which the food is to be heated. The disadvantage of this method is that the heating time is very long, because the desired temperature is reached only asymptotically. The time required for heating may be several hours, which often means that the method cannot, on the whole, be fitted into the necessary routine in a kitchen from which a large number of meals must be served in a relatively short time, as in a school, factory, or restaurant serving food to office workers, for example.

It has been found that frozen food packages can be thawed and heated in as short a time as twenty minutes, for example, without adversely affecting the food when the rate at which heat is supplied to the containers is suitably increased. Heating may be effected by air convection at a temperature considerably higher than the desired final temperature of the food or by radiation or by both air convection and radiation. With these heating methods it is important to discontinue heating at the right moment so that the food will not become too hot, and it is obvious that all of the containers must be evenly heated throughout the entire heating period if they are to be at the same temperature when the heating is terminated.

It is an object of this invention to provide structure for handling food which is especially useful with apparatus for rapidly heating to a definite elevated temperature food held in a plurality of receptacles, such as frozen food, for example, which are openly stacked one above another in vertically spaced relation in an upright heating space. In one form of apparatus of this kind a continuously moving body of heated air is provided in the heating space which envelops all sides of the receptacles, successive portions of which pass only once from an air inlet side of the space to an opposite air outlet side thereof for discharge from the space. The continuously moving body of heated air is formed by dividing the heated air into a plurality of air streams at the air inlet side and forcibly flowing the heated air to the heating space at a sufficiently high velocity for all of the air streams to flow contiguous to one another and horizontally one above another from the air inlet side of the heating space, and by discharging the streams from the heating space exteriorly thereof at the air outlet side of the space.

In accord with the invention, the receptacles are supported in stacks one above another in vertically spaced apertured shelves removably mounted one above another in an upright or vertically extending frame. A mobile support or cart having tracks or guideways for one or more frames is employed to transport the receptacles from place to place. When the cart is moved closely adjacent to apparatus for heating food, frames loaded with a plurality of receptacles can be transferred all at one time into and from the heating apparatus, whereby all of the receptacles can be started and stopped heating at precisely the same time.

Further objects and advantages of the invention will become apparent as the following description proceeds, and the various features of novelty which characterize the invention are pointed out with particularity in the claims annexed to and forming a part of this specification.

For a better understanding of the invention, reference may be had to the following description taken in connection with the accompanying drawing, in which:

FIG. 6 is a front elevation of food handling structure illustrating another modification of the invention;

FIG. 7 is a top plan view of the food handling structure shown in FIG. 6 with the food frames removed therefrom and the front of a heating oven;

FIG. 8 is an end view of the food handling structure shown in FIG. 7;

FIG. 9 is a perspective view of the food frame shown in FIG. 6;

FIG. 10 is a perspective view of an apertured shelf for the food frames shown in FIGS. 6 and 9;

FIG. 11 is an end view of the heating oven shown in FIG. 7 and the food handling structure shown in FIGS. 6, 9 and 10 with the food handling structure adjacent to the heating oven;

FIG. 12 is a view diagrammatically illustrating the heating oven shown in FIG. 11;

FIG. 13 is a fragmentary vertical sectional view of the heating oven shown in FIG. 12, taken at line 13—13 of FIG. 14, illustrating the food frame and shelf of FIGS. 9 and 10 in the heating oven shown in FIG. 12;

FIG. 14 is a horizontal sectional view taken at line 14—14 of FIG. 13; and

Figure 15:
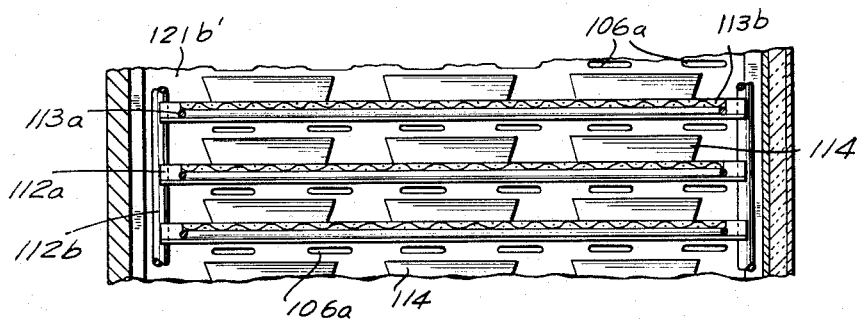
Figure 16:
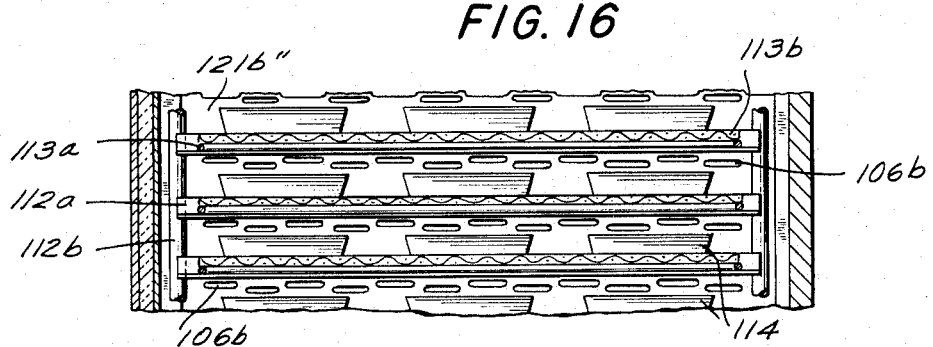

FIGS. 15 and 16 are vertical sectional views taken at lines 15—15 and 16—16, respectively, of FIG. 13.

Figure 3:
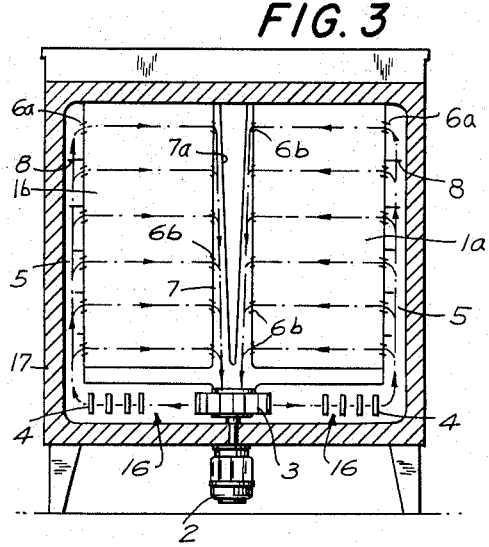
FIG. 3 is a view diagrammatically illustrating the heating oven shown in FIG. 2.

Referring to the drawing, an oven with which the food handling structure of the invention is especially useful is shown in FIG. 3. The oven in FIG. 3 is provided with thermally insulated walls 17 defining a hollow interior having two heating spaces 1a and 1b adapted to receive a plurality of receptacles 14 containing food to be heated. A motor 2 is arranged to drive a fan 3 for discharging air past heating elements 4. The heated air flows from the heating elements 4 into vertically extending passages 5 which may be referred to as air delivery channels. In the air delivery channels 5 are provided vertically spaced baffles 8 which extend horizontally outward from the outer side walls of the heating spaces 1a and 1b. The baffles 8 increase in size from the bottom to the top of each air delivery channel 5 to provide upward paths of flow for heated air in which successive portions of the channels at the baffles 8, in the direction of air flow, become increasingly smaller in cross-sectional area.

The outer side walls of the vertically extending heating spaces 1a and 1b are provided with holes or slots 6a for dividing the heated air in the air delivery channels 5 into a plurality of streams which pass through the heating spaces 1a and 1b in substantially parallel paths of flow. The opposite inner side walls of the heating spaces 1a and 1b are provided with openings or slots 6b for discharging air exteriorly of the heating spaces.

The air discharged from the heating spaces 1a and 1b passes into vertically extending passages 7 which may be referred to as air discharge channels in which air emerging from the openings or slots 6b is collected. The air discharge channels 7, which are formed by a V-shaped member 7a disposed between the inner side walls of the oven spaces 1a and 1b, provide downward paths of flow for air having cross-sectional areas which are increasingly larger in the direction of air flow. The air collected in the air discharge channels 7 flows downward therein to the inlet of the fan 3 from which air is discharged past the heating elements 4.

The oven shown in FIG. 3 and just described is especially suitable for rapidly heating at one time food held in a large number of receptacles. In order to effect uniform heating of all receptacles, especially when the oven has been preheated, it is highly desirable to insert the receptacles into the oven all at one time and also to remove them from the oven all at one time. This is particularly true when the receptacles to be inserted into the oven contain frozen food and are cold to handle, and the receptacles to be removed from the oven have been heated to a definite elevated temperature and are hot to handle.

In accord with the invention, this is accomplished by providing a cart 11 which is movable on wheels 11a with the aid of a handle 11b and provided with two pairs of spaced L-shaped members 11c extending transversely of the cart 11. Each pair of L-shaped members 11c serves as a support for a vertically extending frame 12 having a plurality of side rails 12a at opposing sides thereof which are vertically spaced one above another. The side rails 12a serve as supports for apertured shelves 13 upon which are positioned the receptacles 14 containing food to be heated.

Figure 2:
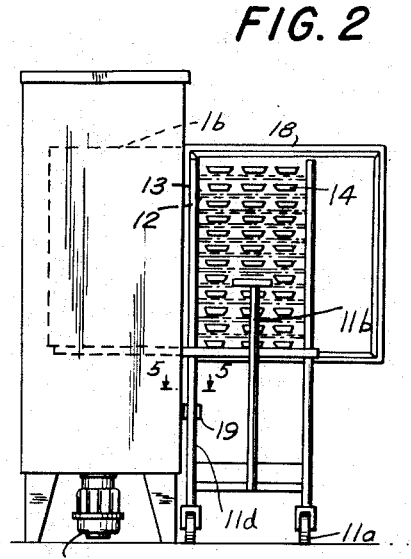
FIG. 2 is an end view of a heating oven and the food handling structure shown in FIG. 1 with the food handling structure in position for food to be transferred into and from the heating oven.

After the receptacles 14 are positioned on the shelves 13 and the frames 12 are loaded, the door 18 of the oven shown in FIG. 3 may be opened and the cart 11 moved in front of the heating spaces 1a and 1b, as diagrammatically illustrated in FIG. 2. In order to align the L-shaped members 11c directly in front of the heating spaces 1a and 1b, respectively, the oven may be provided with suitable fastening members, such as C-shaped resilient clips 19, to receive and hold the legs 11d of the cart 11 adjacent to and immediately in front of the oven.

The L-shaped members 11c function as a track or guideway for the frames 12 and desirably are at the same level as the bottoms of the heating spaces 1a and 1b. When the cart 11 is detachably connected to the oven by the fastening members 19, the frames 12 can be pushed from the L-shaped members or tracks 11c into the heating spaces 1a and 1b, respectively. The cart 11 can immediately be moved from the front of the oven and the door 18 closed, and heating of all the receptacles 14 will commence at the same time.

Figure 4:
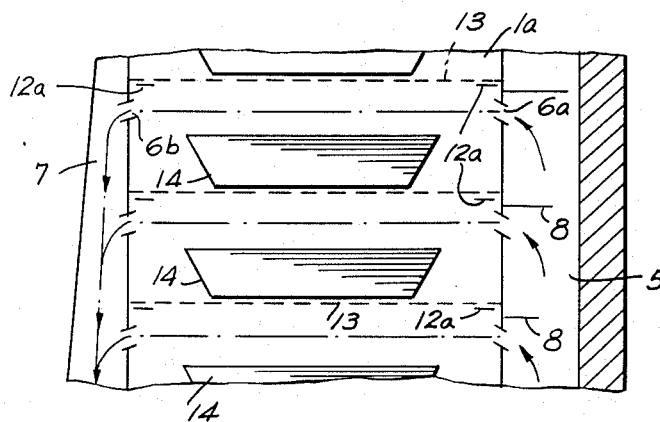
FIG. 4 is an enlarged fragmentary view diagrammatically illustrating parts of the food handling structure of FIG. 1 in the heating oven of FIG. 3.

In the oven, the receptacles 14, which may be frozen food packages, for example, are openly stacked one above another in vertically spaced relation in the upright or vertically extending heating spaces, as diagrammatically illustrated in FIG. 4. In order to effect uniform heating of all of the receptacles 14 in the oven, it is essential that heated air introduced into the heating spaces or heating zones 1a and 1b through the openings or slots 6a flows at substantially the same speed through all parts of each of the heating spaces. Preferably, the heated air should flow at a high rate of speed and the receptacles 14 be so positioned in the heating spaces 1a and 1b that the heated air forcibly sweeps horizontally past the receptacles in paths of flow which are closley adjacent to and in intimate physical contact with them. The streams of heated air pass in parallel paths of flow through the heating spaces in such manner that a given volume of heated air of each stream will enter and be discharged from the heating space and flow only past those food receptacles 14 disposed in its particular horizontal path of flow.

Figure 1:
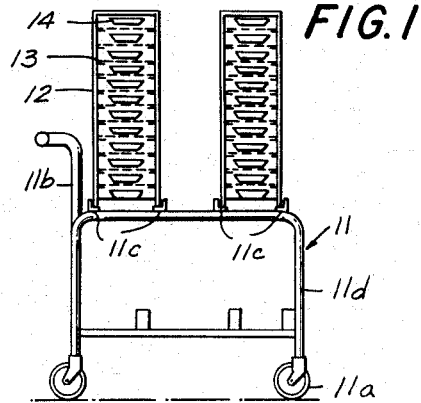
FIG. 1 is an elevational view diagrammatically illustrating food handling structure embodying the invention.

Therefore, when the loaded frames 12 in FIG. 1 are inserted at one time into the heating spaces 1a and 1b of the oven in FIG. 3, the heated air flowing into the air delivery channels 5 is divided into a plurality of air streams at the openings or slots 6a at the outer air inlet sides of the heating spaces.

The baffles 8 in FIG. 3 function to distribute the heated air at the air inlet sides of the heating spaces in such manner that each distributed part of the heated air is introduced into the heating spaces at the slots 6a at an inlet pressure to cause all of the air streams to flow at substantially the same speed across the heating spaces from the air inlet sides to the opposite air outlet sides thereof. Further, the air discharge channels 7 in FIG. 3, which increase in cross-sectional area in the direction of air flow, function to promote the discharge of the air streams at the air outlet side through the slots 6b exteriorly of the heating spaces and the combining of the discharged air streams. Due to the manner in which the baffles 8 function in the air delivery channels 5 and the manner in which the air discharge channels 7 in FIG. 3 function, as just pointed out, the air streams collectively will form a continuously moving body of heated air in each of the heating spaces which envelops all sides of the receptacles 14 in the stack with successive portions thereof passing only once from the air inlet side to the air outlet side for discharge from each heating space. In this way the food in the receptacles of the stack will be rapidly heated uniformly and the food in all of the receptacles will reach the definite elevated temperature at substantially the same time.

In order that the heated air can forcibly sweep past the receptacles 14 in paths of flow which are closely adjacent to and in intimate physical contact with them, as described above, the receptacles desirably are stacked in the frames 12 so that the divided air streams introduced through the slots 6a are directed primarily over the top of one receptacle 14 in the stack and below the next higher receptacle in the stack, as diagrammatically illustrated in FIG. 4. As diagrammatically shown in FIGS. 1 and 4, the height of the receptacles 14 is at least half of the vertical distance between adjacent apertured shelves 13. Thus, the gaps or passages between the receptacles 14 in the stack are relatively narrow and will promote the sweeping effect of the divided heated air streams forcibly flowing past the receptacles and heat transfer to the food in the receptacles 14 by air convection.

Figure 5:
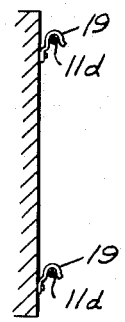
FIG. 5 is a fragmentary sectional view taken at line 5—5 of FIG. 2.

After the food in the receptacles 14 has been heated a sufficient length of time and the food in all of them is heated to the definite elevated temperature, the door 18 can be opened and the cart 11 detachably connected to the front of the oven, as shown in FIGS. 2 and 5 and described above, and the frames 12 can be moved forward from the heating spaces 1a and 1b onto the tracks or guideways formed by the L-shaped rails 11c. With this arrangement all of the receptacles 14 in each frame 12 can be removed from a heating space at one time and the length of time all of the receptacles are heated can be nicely controlled.

When the frames 12 are employed to insert stacks of receptacles 14 into the heating spaces 1a and 1b as a unit, it is desirable to preheat the heating spaces. Since heating of the food in the receptacles 14 desirably is effected at a predetermined temperature which is higher than the final or definite elevated temperature to which the food is to be heated, the heating spaces 1a and 1b should be preheated to a temperature at least as high as the predetermined high temperature. Accordingly, after the heating spaces 1a and 1b have been heated to a temperature at least as high as the predetermined high temperature, the stacks of the receptacles 14 are inserted into the heating spaces at the same time. Likewise, when the food in the receptacles 14 has been heated to the definite elevated temperature, the stacks of receptacles 14 can be removed from the heating spaces at the same time with the air of the chart 11.

Another form of oven with which food handling structure embodying the invention is especially useful is shown in FIGS. 12 to 16. In FIG. 12 a heating oven is provided with a hollow interior having insulated walls 117 within which are disposed casings 121a and 121b defining vertically extending heating spaces 101a and 101b, respectively, adapted to receive receptacles 114 containing food to be heated.

In FIG. 12 a motor 102 is arranged to drive a fan 103 for discharging air past heating elements 104. The heated air flows from the heating elements 104 into vertically extending air delivery channels 105. The outer walls of the heating spaces 101a and 101b are provided with slots 106a for dividing the heated air in the air delivery channels 105 into a plurality of streams which pass through the heating spaces 101a and 101b in substantially parallel paths of flow. The opposite inner side walls of the heating spaces are provided with slots 106b for discharging air exteriorly of the heating spaces.

The air discharged from the heating spaces 101a and 101b passes into vertically extending air discharge channels 107 in which air emerging from the slots 106b is collected. The air discharge channels 107, which are formed by a V-shaped member 107a disposed between the inner side walls of the casings 121a and 121b, provide downward paths of flow for air. The air collected in the air discharge channels 107 flows downward therein to the inlet of the fan 103 from which air is discharged past the heating elements.

In FIG. 12 the air delivery channels 105 are formed by the outer side walls of the casings 121a and 121b, which are vertical and erect, and walls 122a and 122b spaced therefrom which are inclined from the vertical and slope inward toward the right-hand side wall of the casing 121a and left-hand side wall of the casing 121b, respectively.

The heating oven 120 illustrated in FIG. 12 and just described is like the oven in FIG. 3 and especially suitable for rapidly heating at one time food held in a large number of receptacles. In order to insert a large number of the receptacles into the oven all at one time and also to remove them from the oven all at one time, food handling structure like that shown in FIGS. 6, 7 and 8 may be employed. The food handling structure comprises a cart 111 which is movable on wheels 111a with the aid of a handle 111b and provided with two pairs of L-shaped members 111c extending transversely of the cart. As seen in FIGS. 7 and 11, the L-shaped members 111c be provided with rollers 111e mounted for rotation thereon.

Each pair of L-shaped members 111c serves as a support for a frame 112 shown in FIGS. 6, 9 and 11 and like the frames shown in FIG. 1. Each frame 112 comprises spaced U-shaped side members 112b which are connected by end cross members 112c and the bottoms of which serve as skids. Each side member 112b is provided with L-shaped rails 112a which are vertically spaced one above another and serve to support apertured shelves 113. Each shelf 113 comprises a frame 113a of rectangular form and wire mesh or screening 113b secured thereto, as best shown in FIGS. 10, 11 and 14.

After the receptacles 114 are positioned on the shelves 113 and the frames 112 are loaded to provide three vertical stacks of the receptacles on each frame, the door structure 118 of the oven 120 may be opened and the cart 111 moved in front of the heating spaces 101a and 101b, as shown in FIG. 11. The L-shaped members 111c desirably are aligned with spaced tracks or rails 123a in the bottom end walls of the heating spaces 101a and 101b, the rails 123a being best shown in FIGS. 11 and 14. Stated another way, the tracks or rails 123a from guideways at surfaces at the vicinities of the bottom walls of the vertically extending heating spaces 101a and 101b. To locate the cart 111 in its proper food handling position in front of the oven 120, the latter may be provided with suitable fastening members, such as C-shaped clips 119, to receive and hold the legs 111d adjacent to and immediately in front of the oven, as best shown in FIGS. 7 and 11.

Rollers 123b may be mounted on the rails 123a for rotation thereon to facilitate transfer of the frames 112 from the cart 111 into the heating spaces 101a and 101b and from the latter back to the cart 111. As shown in FIG. 11, the oven 120 may be provided with legs 124 which are vertically adjustable at 124a to adjust the oven vertically with respect to the cart 111, so that the rails 111c on the cart and the rails 123a in the bottom walls of the heating spaces will be at the same height. After the frames 112 are pushed into the heating spaces 101a and 101b, the cart 111 can be moved from the front of the oven 120 and the door structure 118 closed, and heating of all the receptacles 114 will commence at the same time.

As shown in FIG. 15, the slots 106a at the outer air inlet sides 121a' and 121b' of the heating spaces 101a and 101b, respectively, are formed in horizontal rows which are vertically spaced from one another. As shown in FIG. 16, the slots 106b at the inner air outlet sides 121a" and 121b" of the heating spaces 101a and 101b, respectively, also are formed in horizontal rows which are vertically spaced from one another. The slots 106a in each row of slots at the air inlet sides 121a' and 121b' of the heating spaces are in horizontal alignment in single file. The slots 106b in each row of slots at the air outlet sides 121a" and 121b" of the heating spaces are divided into two vertically spaced groups which are closely adjacent to one another and in staggered relation, alternate slots in each row forming one group and the remaining slots in the row forming the group, whereby the slots 106b in each row extend in a zig-zag path from the front to the rear of the heating spaces 101a and 101b at the air outlet sides thereof.

The receptacles 114 are stacked in the frames 112 so that the divided air streams introduced through the slots 106a are directed primarily over the tops of the receptacles 114 on one of the shelves 113 in the stacks and below the receptacles on the next higher shelf 113 in the stacks, as illustrated in FIGS. 13, 15 and 16. The height of the receptacles 114 is at least half of the vertical distance between adjacent apertured shelves 113, whereby the gaps between the receptacles 114 in the several stacks are relatively narrow and will promote the sweeping effect of the divided heated air streams flowing past the receptacles and heat transfer to the food in the receptacles 114 by air convection. Hence, the receptacles 114 are supported on the shelves 113 in such manner that the receptacles offer minimum resistance to flow of heated air in the heating spaces. As best shown in FIG. 16, the slots 106b at the air outlet sides of the heating spaces 101a and 101b also are vertically disposed with respect to the shelves 113 and receptacles 114 to promote discharge of the air streams flowing over the tops and bottoms, respectively, of the receptacles in the several stacks.

When heating of food in the receptacles 114 is being effected objectionable fumes often are produced which are taken up by the circulating heating air. Also, when the receptacles 114 contain frozen food which must be both thawed and heated before it is served, the heating air becomes laden with moisture in the form of water vapor. In order to remove fumes and moisture from the heating air, the oven 120 in FIG. 12 is provided with a vent, as indicated at 125. By providing the vent the circuits for circulation of heating air in the oven 120 operate substantially at atmospheric pressure and a suitable conduit (not shown) may be connected to the vent 125 in which the vented water vapor condenses and through which the condensed moisture is conducted to waste along with the fumes vented from the oven.

After the food in the receptacles 114 has been heated a sufficient length of time and the food in all of them is heated to the definite elevated temperature, the door structure 118 can be opened and the cart 111 detachably connected to the front of the oven with the aid of the C-shaped clips 119. The frames 112 can be moved forward from the heating spaces 101a and 101b and onto the tracks or rails 111c of the cart 111, and the cart can then be detached from the heating oven 120.

In the heating oven 120 being described, the fan 103 functions to deliver heated air at a sufficiently high velocity for the air to be divided at the air inlet slots 106a into a plurality of streams which flow contiguous to one another and horizontally one above another from the air inlet sides to the air outlet sides of the heating spaces and discharge through the slots 106b exteriorly of the heating spaces.

The air delivery channels 105 function to distribute the heated air at the air inlet sides of the heating spaces in such manner that each distributed part of the heated air is introduced into the heating spaces at the slots 106a at an inlet pressure to cause all of the streams to flow at substantially the same speed across the heating spaces or heating zones 101a and 101b from the air inlet sides to the air outlet sides thereof.

In a heating oven which has been constructed and like that shown in FIGS. 12 to 16 and just described, it is possible to heat seventy-two frozen food packages at one time arranged in six stacks of twelve packages each, each frame 112 holding three stacks of the packages. Before the frozen food packages, which are at a temperature of about −20° C. to −25° C., are inserted into the oven, which is provided with a suitable thermostatic control (not shown), the oven under thermostatic control desirably is preheated to a temperature of about 230° C. When the oven is empty and preheated to such a high temperature, the maximum temperature differential in each heating space 101a and 101b may be about 2.8° C. When the oven has attained the temperature of about 230° C., the oven thermostat may then be adjusted to maintain the heating spaces at a predetermined temperature of about 180° C. and all of the frozen food packages inserted into the heating oven at one time. Separate timer mechanisms may be employed to control the length of time heating is effected by the heating elements 104 and the length of time the fan 103 operates, and it may be desirable to allow the fan 103 to operate for a short time, such as five minutes, for example, after the heating elements cease to operate, to promote uniform heating of the food packages. In an overall cooking time of about twenty to thirty minutes the frozen food packages will all be heated to substantially the same temperature, which is the definite elevated temperature at which the food is to be served.

It will now be understood that in both of the embodiments illustrated and described above the vertically spaced shelves supported on the frames or stacking means are vertically offset with the vertically spaced slots in the air inlet and air outlet sides of the heating spaces. Further, the frames in both embodiments are open at the sides thereof to promote flow of air from the slots at the air inlet sides of the heating spaces toward the gaps at one side of the frames, and to promote flow of air from the gaps at the opposite sides of the frames toward the slots at the air outlet sides of the heating spaces.

Modifications of the embodiments of the invention which have been described and illustrated will occur to those skilled in the art, so that it is desired not to be limited to the particular arrangements set forth. Moreover, certain features of the invention can be advantageously employed independently of other features. Therefore, it is intended in the claims to cover all those modifications and features which do not depart from the spirit and scope of the invention. However, subject matter shown in FIGS. 3 and 4 and in FIGS. 12 to 16 and described herein which is common to this application and to copending application Serial No. 346,549, filed February 21, 1964, and not being claimed herein is being claimed in application Serial No. 346,549.

What is claimed is:

1. Apparatus of the class described for heating food held in receptacles having, in combination, an oven providing a hollow interior having opposing side walls and top and bottom walls defining a vertically extending heating space with a front access opening and closure means therefor movable between closed and open positions, the opposing side walls having vertically spaced slots and respectively defining an air inlet side and an air outlet side of the heating space, and means for forcibly circulating heated air at a sufficiently high velocity through the heating space between the air inlet and air outlet sides thereof and cause the air to be divided at the slots at the air inlet side to produce a plurality of air streams which flow contiguous to one another and horizontally one above another through the heating space from the air inlet side to the air outlet side thereof and discharge through the slots in the air outlet side exteriorly of the space, structure for handling food which is insertable and removable into and from the heating space and comprises means for openly stacking a plurality of the receptacles one above another in vertically spaced relation, the stacking means comprising a vertically extending frame, a plurality of apertured shelves, means on the frame for carrying the shelves one above another in vertically spaced relation and upon which the receptacles are adapted to be supported, the shelves having vertical gaps therebetween, the heating space accommodating the receptacle stacking means with the vertically spaced shelves thereof vertically offset with the vertically spaced slots in the air inlet and air outlet sides of the heating space, and the frame being open at the sides thereof to promote flow of air from the slots at the air inlet side of the heating space toward the gaps at one side of the frame and to promote flow of air from the gaps at the opposite side of the frame toward the slots at the air outlet side of the heating space.

2. Apparatus of the class described as set forth in claim 1 in which the frame is of rectangular form and comprises an open network of parts including upright corner posts, elongated end members which extend crosswise of the frame and are connected at their ends to the corner posts, and elongated side members which extend lengthwise of the frame and are connected at their ends to the corner posts, the last-mentioned members including elements at each side of the frame disposed one above another in vertically spaced relation, at least some of the elements at one side of the frame being opposite and substantially at the same level as a different one of the elements at the other side of the frame, and means including each pair of elements at opposing sides of the frame which are opposite one another for removably supporting a different one of the shelves.

3. Apparatus of the class described as set forth in claim 2 in which the elements for removably supporting the shelves at each side of the frame are L-shaped angle members with the horizontal arms thereof extending toward one another.

4. Apparatus of the class described as set forth in claim 3 in which each shelf comprises a frame element of rectangular form and essentially flat screening fixed at its periphery to the frame element.

5. Apparatus of the class described for heating food held in receptacles having, in combination, heating structure including a cabinet having a thermally insulated interior with a front access opening and closure means therefor movable between closed and open positions and means for openly stacking a plurality of the receptacles one above another in vertically spaced relation in the interior of the cabinet, the stacking means comprising a vertically extending frame, a plurality of apertured shelves, means on the frame for carrying the shelves one above another in vertically spaced relation and upon which the receptacles are adapted to be supported, the shelves having gaps therebetween, the heating structure defining a heating space formed by spaced vertically extending walls having vertically spaced slots which are vertically offset with the vertically spaced shelves and respectively define an air inlet side and air outlet side of the heating space, means for forcibly circulating heated air at a sufficiently high velocity through the heating space between the air inlet and air outlet sides thereof and cause the air to be divided at the slots at the air inlet side to produce a plurality of air streams which flow contiguous to one another and horizontally one above another through the heating space from the air inlet side to the air outlet side thereof and discharge through the slots in the air outlet side, the slots at the air inlet side of the air inlet space functioning to promote flow of air therefrom toward the gaps between the shelves at one side of the frame and the slots at the air outlet side of the heating space functioning to promote flow of air from the gaps between the shelves toward the last-mentioned slots at the opposite side of the frame, and the open stacking means being removable from and insertable into the interior of the cabinet.

References Cited by the Examiner

UNITED STATES PATENTS

| 2,060,992 | 11/1936 | Jackson | 66—260 |
| 2,620,932 | 12/1952 | Alpine | 219—38.24 |
| 3,021,795 | 2/1962 | Hayba et al. | 214—28.24 |

FOREIGN PATENTS

| 1,198,612 | 6/1959 | France. |

FREDERICK L. MATTESON, JR., *Primary Examiner.*

JAMES W. WESTHAVER, *Examiner.*

E. G. FAVORS, *Assistant Examiner.*